Sept. 29, 1959 H. GABRIEL 2,906,383
CLUTCH COUPLING
Filed July 6, 1955

Inventor:
HERMANN GABRIEL,
BY
ATTORNEYS

United States Patent Office 2,906,383
Patented Sept. 29, 1959

2,906,383
CLUTCH COUPLING

Hermann Gabriel, Friedrichshafen, Germany, assignor to Zahnradfabrik Friedrichshafen, Friedrichshafen am Bodensee, Germany Application July 6, 1955, Serial No. 520,247

Claims priority, application Germany July 10, 1954

15 Claims. (Cl. 192—85)

This invention relates to clutches and more particularly to a coupling device for a claw-type clutch.

It is an object of the present invention to provide a compact sturcture for a claw-type clutch wherein the actuating means is positioned within a portion of the clutch body and surrounds a shaft which carries the clutch.

It is a further object of the invention to provide a claw-type clutch actuating mechanism comprising means for absorbing the initial shock of engagement between the claw elements.

In attainment of the above objects, I provide a construction wherein a tubular pressure piston encompasses the clutch shaft which piston may be motivated to bring clutch-engaging pressure on a claw element through a suitable spring which likewise encompasses the shaft and is disposed within the tubular piston body. By such construction I am enabled to manufacture a clutch of the claw-type which is not only compact and simple, but which is superior in operation by virtue of the shock-absorbing effect of the spring incorporated in the mechanism.

Figure 1:
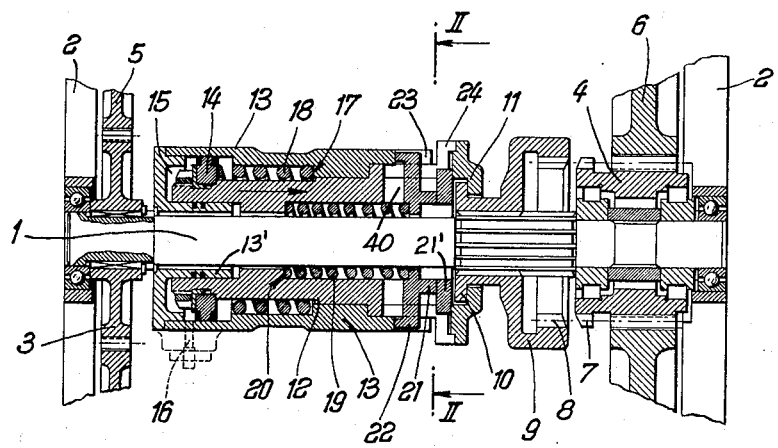
Figure 2:
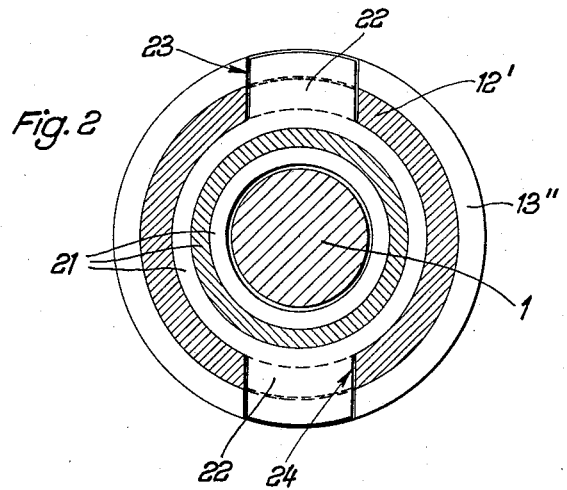

My invention will now be described in detail in conjunction with the appended drawing, in which:

Fig. 1 illustrates a longitudinal section through the clutch coupling mechanism, and Fig. 2 is a section through line 2—2 of Fig. 1.

With reference to the drawing, my invention will be seen to comprise a rotary shaft 1 suitable journalled within a transmission housing 2 and having keyed thereto the gear 3 meshing with the gear 5, at one end thereof. On the other end of the shaft a gear 4 is carried normally having free rotative engagement on suitable bearings and which may mesh with a gear 6 as shown. The gear 4 is provided with external claw teeth 7 extending outwardly of the gear hub in a radial direction in a well known manner. Thus, the teeth 7 are provided in plurality around the periphery of the hub of the gear 4 and will be understood to be engageable with a like number of internal teeth 8 provided within a female claw element 9 carried on shaft 1 and which will be understood to have slidable, splined relationship with the shaft as indicated on Fig. 1.

Accordingly, it will be apparent from the description thus far that the claw 9 may be moved to the right as viewed on Fig. 1, and the teeth 8 will engage the teeth 7 thereby locking the gear 4 to shaft 1 thus effecting rotation of that gear along with shaft 1.

The inner end of the claw element 9 is provided with a flange 10 having reciprocal lost motion engagement as well as rotative engagement with an end gap 11 for the purpose of normally retaining element 9 in non-clutching position. It will be appreciated that either the cap 11 or the claw 9 may be of split-body construction for the purpose of effecting assembly.

A tubular piston 12 is incorporated within a non-rotative cylinder housing 13. The end cap 11 is secured to the outer face of the piston 12 as by screws (not shown). The piston 12 is sealed internally by a re-entrant collar 13' or end cap secured in the lefthand end (Fig. 1) of cylinder 13 and has a sealing ring 14 intermediate the piston body and the inside surface of the cylinder, the cylinder having the pressure chamber 15 into which pressure fluid may be introduced via the piping 16. A compression spring 18 is utilized to maintain a bias on the piston in the direction of the pressure chamber 15, thereby normally maintaining the claw 9 out of engagement with gear 4 by means of the end cap 11 abutting flange 10.

Provided internally within piston 12 is a compression spring 19 bearing against a shoulder 20 at one end, the shoulder being provided in the piston as shown. Piston 12 has a spacing or gap 40 from a pressure plate 21. The other end of spring 19 gears against pressure plate 21 having a slight gap or spacing from flange 10 and having a pair of diametrically opposed flanges 22 which are slidably disposed within slots 23 provided in the outer skirt 13'' of non-rotative cylinder 13. The flanges 22 likewise pass through and have slidable engagement with slots 24 disposed in the outer skirt 12' of the piston 12. Thus, it will be apparent that the piston is constrained to longitudinal movement and prevented from having any rotative movement by virtue of the construction of the pressure plate 21. Plate 21 has an enlarged flange 21' which normally engages the end cap 11 and is biased thereagainst by the spring 19. However, due to the construction, flange 21' has the lost motion with respect to end cap 11 and can separate therefrom when the piston moves in the direction of the arrow, under certain conditions to be described below.

In operation, when a pressure fluid is introduced into the chamber 15, piston 12 moves in the direction of the arrow reducing the gap 40 and it will be apparent that the pressure plate 21 and end cap 11 move therewith, inasmuch as the end cap 11 is secured to the piston and plate 21 is biased against the end cap by spring 19. When, however, the outer flange 21' of plate 21 engages flange 10, movement of the claw 9 to the right will be effected. This will effect initial engagement between the two sets of claw teeth 7 and 8. However, such engagement is effected through the spring 19, as will be apparent since the only force transmission between the piston and claw 9 takes place through this spring. Accordingly, any initial clashing of two sets of claw teeth will be resiliently absorbed by the spring, there being no positive direct thrust exerted during the formation of engagement. This action serves to prevent chipping and breaking of the claw teeth, as well as unwarranted strain on the entire mechanism, as will be readily apparent. Thus end cap 11 may continue to move to the right because of motion of the piston, while separating from flange 21' effects compression of spring 19, the compressive force being exerted against flange 10. Full intermesh of teeth 7 and 8 is accomplished by expansion of spring 19 after an initial period of compression until the two sets of teeth are synchronized. Ultimately the gap 40 may be completely taken up at the time the claws are operatively meshed.

My invention is particularly useful in transmission systems where a synchronizing gear shifting effect is desired, for example, for engagement of reverse idle gear shafts.

While I have described but a single embodiment of my invention, I am aware that various changes may be made without departing from the spirit thereof. Accordingly, I do not seek to be limited to the precise illustration herein given except as set forth in the appended claims.

I claim:

1. In a claw-type clutch, a shaft, a claw element slidably carried on said shaft, a pressure piston surrounding said shaft for effecting axial motion of said claw element and resilient means intermediate said pressure piston and said claw element for transmitting force from said pressure piston to said claw element for moving said claw element into clutching engagement, a pressure cylinder surrounding said pressure piston, and additional resilient means for biasing said piston within said cylinder in a direction opposite to the direction effected by said piston in moving said claw element into clutching engagement, and a claw element engageable by said first-mentioned claw element.

2. In a claw-type clutch as set forth in claim 1, including lost-motion means for securing said first-mentioned claw element to said piston, said means being carried by said piston and engageable with said first-mentioned claw element to maintain said first-mentioned claw element out of clutching engagement by virtue of the bias of said additional resilient means.

3. In a claw-type clutch, a shaft, a claw element slidably carried on said shaft, a pressure piston surrounding said shaft for effecting axial motion of said claw element and resilient means intermediate said pressure piston and said claw element for transmitting force from said pressure piston to said claw element for moving said claw element into clutching engagement, including a pressure cylinder surrounding said pressure piston, said cylinder and said piston terminating in concentric skirts having slot means and means disposed within said slot means to prevent relative rotative motion between said piston and said cylinder.

4. In a clutch device, a clutch element carried on said shaft, a tubular piston surrounding said shaft, a pressure cylinder surrounding said piston, a pressure plate surrounding said shaft and movable by said piston for moving said clutch element carried on said shaft, said piston and cylinder having circumferentially-spaced, axially extended slot means and said pressure plate having portions extending into said slot means to prevent rotary motion relative said piston and cylinder.

5. A clutch actuating mechanism as set forth in claim 4, including a spring surrounding said shaft and disposed internally of said piston, said piston having a shoulder therein, said spring having one end engaging said shoulder in said piston and another end engaging said pressure plate, said pressure plate being axially movable relative to said slot means to actuate said clutch element, wherein force is transmitted from said piston through said spring to said pressure plate and thence to said clutch element.

6. In a device as set forth in claim 5, including an end cap carried by said piston and secured thereto and having a lost motion connection with said clutch element, and means for biasing said piston with respect to said cylinder so as to take up the lost motion between said end cap and said clutch element to declutch said clutch element.

7. In a claw-type clutch, a shaft, a clutch element slidably carried on said shaft, a pressure piston surrounding said shaft for effecting axial motion of said clutch element and a resilient element intermediate said pressure piston and said clutch element for transmitting force from said pressure piston to said clutch element for moving said clutch element into clutching engagement, said piston having lost-motion spacing relative said clutch element, and a pressure plate engageable with said disposed clutch element and within said lost-motion spacing, said resilient element being intermediate said piston and said pressure plate for transmitting force from said piston to said pressure plate in one direction of motion of said piston, said pressure plate being directly engageable with said clutch element for moving said clutch element into clutching position, said lost-motion spacing being diminished during initial transmission of force from said pressure plate to said clutch element, means secured to said piston and engageable with said clutch element and serving to withdraw said clutch element from clutch-engaging position in the opposite direction of motion of said piston and a clutch element engageable by said first-mentioned clutch element.

8. In a clutch device, a shaft, a clutch element carried on said shaft, a tubular piston surrounding said shaft, a pressure cylinder surrounding said piston, a pressure plate surrounding said shaft and movable by said piston for moving said clutch element carried on said shaft, including a spring surrounding said shaft and disposed internally of said piston, said piston having a shoulder therein, said spring having one end engaging said shoulder in said piston and another end engaging said pressure plate, said pressure plate being axially movable, means to prevent rotation of said piston and said pressure plate, wherein force is transmitted from said piston through said spring to said pressure plate and thence to said clutch element.

9. In a clutch device, a shaft, a clutch element carried on said shaft, a tubular piston surrounding said shaft, a pressure cylinder surrounding said piston, a pressure plate surrounding said shaft and movable by said piston for moving said clutch element carried on said shaft, including a spring surrounding said shaft and disposed to transmit piston force to said pressure plate, an end cap carried by said piston and secured thereto and having a lost motion connection with said clutch element, and means for biasing said piston with respect to said cylinder so as to take up the lost motion between said end cap and said clutch member to declutch said clutch element, and a clutch element engageable by said first-mentioned clutch element.

10. In a claw-type clutch, a rotary shaft 1, a tubular piston 12 surrounding said shaft and having a peripheral interior, a pressure cylinder 13 having an internal annular wall surrounding said piston, said pressure cylinder having a re-entrant collar 13' sealingly engageable with a peripheral face of said piston, said piston having sealing engagement 14 with the internal annular wall of said pressure cylinder, a pressure plate 21 actuatable by said piston, and a claw element 9 carried on said shaft and engageable by said pressure plate for moving in a direction to effect clutching engagement, and a claw element engageable by said first-mentioned claw element.

11. In a claw-type clutch, a shaft 1, a clutch element 9 slidably carried on said shaft, a pressure piston 12 surrounding said shaft for effecting axial motion of said clutch element, a pressure cylinder 13 having an internal wall surrounding said pressure piston, and resilient means 19 intermediate said pressure piston and said clutch element for transmitting force from said pressure piston to said clutch element for moving said clutch element into clutching engagement, said pressure cylinder having a fixed stop at its internal wall, said pressure piston abutting said stop at the end of its power stroke to avoid positive engagement between said pressure piston and said clutch element, and a clutch element engageable by said first-mentioned clutch element.

12. In a clutch device, a shaft, a clutch element carried on said shaft, a tubular piston surrounding said shaft, a pressure cylinder having an internal wall surrounding said piston, a pressure plate surrounding said shaft and movable by said piston for moving said clutch element carried on said shaft, including a spring surrounding said shaft and disposed to transmit piston force to said pressure plate, an end cap carried by said piston and secured thereto and having a lost motion connection with said clutch element, and means for biasing said piston with respect to said cylinder so as to take up the lost motion between said end cap and said clutch member to declutch said clutch element, said pressure cylinder having a fixed stop at its internal wall, said pressure piston abutting said stop at the end of its power stroke to avoid positive engagement between said pressure piston and said clutch element, and a clutch element engageable by said first-mentioned clutch element.

13. In a clutch device, a shaft, a clutch element carried on said shaft, a tubular piston surrounding said shaft, a pressure cylinder having an internal wall surrounding said piston, a pressure plate surrounding said shaft and movable by said piston for moving said clutch element carried on said shaft, including a spring surrounding said shaft and disposed internally of said piston, said piston having a shoulder therein, said spring having one end engaging said shoulder in said piston and another end engaging said pressure plate, said pressure plate being axially movable, means to prevent rotation of said piston and said pressure plate, wherein force is transmitted from said piston through said spring to said pressure plate and thence to said clutch element, said pressure cylinder having a fixed stop at its internal wall, said pressure piston abutting said stop at the end of its power stroke to avoid positive engagement between said pressure piston and said clutch element.

14. In a claw-type clutch, a shaft, a clutch element slidably carried on said shaft, a pressure piston surrounding said shaft for effecting axial motion of said clutch element and a resilient element intermediate said pressure piston and said clutch element for transmitting force from said pressure piston to said clutch element for moving said clutch element into clutching engagement, said piston having lost-motion spacing relative said clutch element, and a pressure plate engageable with said clutch element and disposed within said lost-motion spacing, said resilient element being intermediate said piston and said pressure plate for transmitting force from said piston to said pressure plate in one direction of motion of said piston, said pressure plate being directly engageable with said clutch element for moving said clutch element into clutching position, said lost-motion spacing being diminished during initial transmission of force from said pressure plate to said clutch element, means secured to said piston and engageable with said clutch element and serving to withdraw said clutch element from clutch-engaging position in the opposite direction of motion of said piston, a pressure cylinder having a fixed stop at its internal wall, said pressure piston abutting said stop at the end of its power stroke to avoid positive engagement between said pressure piston and said clutch element, and a clutch element engageable by said first-mentioned clutch element.

15. In a claw-type clutch, a shaft, a claw element slidably carried on said shaft, a pressure piston surrounding said shaft for effecting axial motion of said claw element and resilient means intermediate said pressure piston and said claw element for transmitting force from said pressure piston to said claw element for moving said claw element into clutching engagement, a pressure cylinder having an internal wall surrounding said pressure piston, and additional resilient means for biasing said piston within said cylinder in a direction opposite to the direction effected by said piston in moving said claw element into clutching engagement, including lost-motion means for securing said claw element to said piston, said means being carried by said piston and engageable with said claw element to maintain said claw element out of clutching engagement by virtue of the bias of said additional resilient means, said pressure cylinder having a fixed stop at its internal wall, said pressure piston abutting said stop at the end of its power stroke to avoid positive engagement between said pressure piston and said claw element, and a claw element engageable by said first-mentioned claw element.

References Cited in the file of this patent

UNITED STATES PATENTS

| | | |
|---|---|---|
| 794,899 | Sturtevant | July 18, 1905 |
| 1,345,633 | Pyle | July 6, 1920 |
| 2,356,598 | Lang et al. | Aug. 22, 1944 |
| 2,397,883 | Peterson | Apr. 2, 1946 |
| 2,428,336 | Munschauer | Sept. 30, 1947 |
| 2,541,452 | Wemp | Feb. 13, 1951 |
| 2,605,749 | Buckendale | Aug. 5, 1952 |
| 2,634,621 | Kanuch | Apr. 14, 1953 |
| 2,715,343 | Youngren | Aug. 16, 1955 |
| 2,791,131 | Boughner | May 7, 1957 |
| 2,791,771 | Schou | May 7, 1957 |

FOREIGN PATENTS

| | | |
|---|---|---|
| 17,167 | Great Britain | of 1911 |
| 564,638 | Great Britain | Oct. 6, 1944 |